(12) United States Patent
Bender

(10) Patent No.: US 6,871,631 B2
(45) Date of Patent: Mar. 29, 2005

(54) THROTTLE VALVE BODY

(75) Inventor: Guenther Bender, Rodheim (DE)

(73) Assignee: Siemens AG, München (DE)

( * ) Notice: Subject to any disclaimer, the term of this patent is extended or adjusted under 35 U.S.C. 154(b) by 0 days.

(21) Appl. No.: 10/846,581

(22) Filed: May 17, 2004

(65) Prior Publication Data
US 2004/0211391 A1 Oct. 28, 2004

Related U.S. Application Data

(63) Continuation of application No. PCT/DE02/03822, filed on Oct. 10, 2002.

(30) Foreign Application Priority Data

Nov. 26, 2001 (DE) .......................... 101 57 963

(51) Int. Cl.$^7$ ................................. F02D 9/10
(52) U.S. Cl. ..................... 123/337; 251/305
(58) Field of Search ............... 123/337; 251/305, 251/308

(56) References Cited

U.S. PATENT DOCUMENTS

| 5,275,375 | A | | 1/1994 | Semence |
| 5,342,019 | A | * | 8/1994 | Braun et al. ............... 251/305 |
| 5,615,861 | A | | 4/1997 | Pollmann et al. |
| 6,036,172 | A | | 3/2000 | Pajard |

FOREIGN PATENT DOCUMENTS

| DE | 3802243 A1 | 8/1989 |
| DE | 4229299 C1 | 1/1994 |
| DE | 19909982 A1 | 9/2000 |
| DE | 10105526 A1 | 8/2002 |

OTHER PUBLICATIONS

Derwent–Abstract; DE–10105526A1; Aug. 14, 2002; Robert Bosch GmbH, D–70469 Stuttgart.

Derwent–Abstract; DE–4229299C1; Jan. 13, 1994; MTU–Motoren– und Turbinen–Union Friedrichshafen GmbH, D–88045 Friedrichshafen.

Derwent–Abstract; DE–19909982A1; Sep. 7, 2000; Robert Bosch GmbH, D–70469 Stuttgart.

Derwent–Abstract; DE–3802243A1M; Aug. 10, 1989; Daimler–Benz AG, D–7000 Stuttgart.

* cited by examiner

Primary Examiner—Tony M. Argenbright
(74) Attorney, Agent, or Firm—Siemens AG; Jacob Eisenberg

(57) ABSTRACT

The present invention relates to a throttle valve body for an internal combustion engine, including a housing and a cross-flow hole in the housing, which can be blocked by a throttle valve. The throttle valve is arranged on a shaft that can pivotally driven about its longitudinal axis which extends crosswise to the longitudinal axis of the cross-flow hole. The free ends of the shaft are pivotally mounted in bearings arranged in recesses in the housing. The shaft valve is secured against axial displacement by an axial safety device. The throttle valve has bearing surfaces in support areas that are fixed to the housing in the areas in which the shaft projects axially.

26 Claims, 7 Drawing Sheets

THROTTLE VALVE BODY

CROSS REFERENCE TO RELATED APPLICATIONS

The present application claims priority to International Patent Application number PCT/DE02/03822, filed Oct. 10, 2002, which claimed the United States, and further claims priority to German patent application 10157963.2, filed Nov. 26, 2001, the both of which are herein incorporated by reference.

BACKGROUND OF THE INVENTION

The invention relates to a throttle valve body for an internal combustion engine, comprising a housing and a crossflow opening in the housing, which can be blocked by a throttle valve, the throttle valve being arranged on a throttle valve shaft which can be driven so as to pivot about its longitudinal axis extending transversely with respect to the longitudinal axis of the crossflow opening and whose free ends are mounted such that they can pivot in bearings which are arranged in bearing recesses in the housing, and the throttle valve shaft being secured against axial displacement by an axial safety device, in its regions in which the throttle valve shaft protrudes axially, the throttle valve having run-on surfaces which bear on supporting regions fixed to the housing.

In such throttle valve bodies, in order to secure the throttle valve shaft axially, it is known to arrange a radially circumferential groove in their regions projecting into the bearing recess, into which groove a retaining element fixed to the housing projects radially.

If the groove is machined into the throttle valve shaft, this weakens the stability of the throttle valve shaft. Rings pressed onto the throttle valve shaft, between which the groove is formed, need accurate and therefore expensive fits and entail the risk of shaft deformation and therefore impairment of the shaft circularity. This leads to increased friction and therefore to a poorer torque balance requiring more powerful return springs for returning the throttle valve into the idling position, and more powerful and therefore larger motors for adjusting the throttle valve shaft.

The construction of the axial safety device is complicated, needs a great deal of space and can be mounted only laboriously. Furthermore, in the case of such axial safety devices, high production accuracies have to be maintained in order that the throttle valve can be positioned accurately in the crossflow opening.

U.S. Pat. No. 5,275,375 discloses a throttle valve body of the type mentioned at the beginning in which the supporting regions are formed by those regions of the inner wall of the crossflow opening of the housing which surround the bearing recesses. Therefore, the position of the throttle valve in the crossflow opening depends on the production tolerances of throttle valve and crossflow opening.

SUMMARY OF THE INVENTION

It is therefore an object of the invention to provide a throttle valve body of the type mentioned at the beginning which, with a simple construction, can be positioned easily and accurately in the crossflow opening and secured axially.

According to the invention, this object is achieved in that the supporting regions are the ends of the bearings oriented toward the crossflow opening.

As a result of the throttle valve bearing with its run-on surfaces on the supporting regions fixed to the housing, not only is the position of the throttle valve shaft secured axially but, at the same time, there is also exact positioning of the throttle valve shaft in the crossflow opening of the throttle valve body.

A simple design, needing no substantial expenditure on components, is achieved. During assembly, as a result of the positioning of the bearings, both the accurate position in the crossflow opening of the throttle valve previously firmly connected to the throttle valve shaft and an accurately defined spacing of the bearings from one another is achieved, which is oriented toward the actual dimensions of the throttle valve and of the crossflow opening and in this way compensates for existing tolerances. This can advantageously be used in throttle valve bodies whose throttle valve and housing consist of metal.

In order to ensure the same axial play in every position of the throttle valve, the run-on surfaces can extend at right angles to the longitudinal axis of the throttle valve shaft and parallel to each other.

It serves the same purpose if the supporting regions extend at right angles to the longitudinal axis of the throttle valve shaft.

If the throttle valve has a holding sleeve, in whose recess the throttle valve shaft is firmly arranged and whose ends form the run-on surfaces, then run-on surfaces on the throttle valve shaft are achieved in a simple manner.

In order to avoid air leaks when the throttle valve is closed, the throttle valve can, in a simple way, have a stadium-like circumferential contour which, starting from the mutually parallel run-on surfaces, is formed in a circular and/or curved shape.

The extent of the supporting regions in the direction of the longitudinal axis of the crossflow opening and/or transversely with respect to the direction of the longitudinal axis of the crossflow opening preferably corresponds approximately to the external diameter of the holding sleeve.

Following insertion of the throttle valve into the crossflow opening and introduction of the throttle valve shaft into the axial recess of the holding sleeve, in order to connect the throttle valve firmly to the throttle valve shaft, the throttle valve shaft can be fixed in the axial recess in the holding sleeve by means of a pin passing transversely through holding sleeve and throttle valve shaft or a screw passing through transversely.

Simple assembly for the exact positioning of the throttle valve in the crossflow opening and simultaneous axial securing is achieved by the bearings having bearing sleeves which are inserted into the bearing recesses of the housing with a press fit, the bearing sleeves being pressed axially into the bearing recesses as far as their position bearing on the run-on surfaces.

In this case, the run-on surfaces on the throttle valve can be configured simply if the bearing sleeves project into the crossflow opening by a small amount.

In principle, the bearings can be formed both as sliding bearings with bearing bushes or else as rolling-contact bearings, in particular as needle bearings.

If the bearings are rolling-contact bearings with an inner ring and an outer ring, then those ends of the inner rings or of the outer rings which are oriented toward the crossflow opening form the supporting regions. During the assembly of the rolling-contact bearings, their axial extrusion forces are at the same time the load-bearing limits of the axial safety device.

The housing and/or the throttle valve can consist either of a plastic or of metal, in particular lightweight metal.

For the purpose of simple production, in this case the housing and/or the throttle valve is an injection molding.

BRIEF DESCRIPTION OF THE SEVERAL VIEWS OF THE DRAWINGS

Exemplary embodiments of the invention are illustrated in the drawing and will be described in more detail below, wherein.

DETAILED DESCRIPTION OF THE INVENTION

Figure 1:
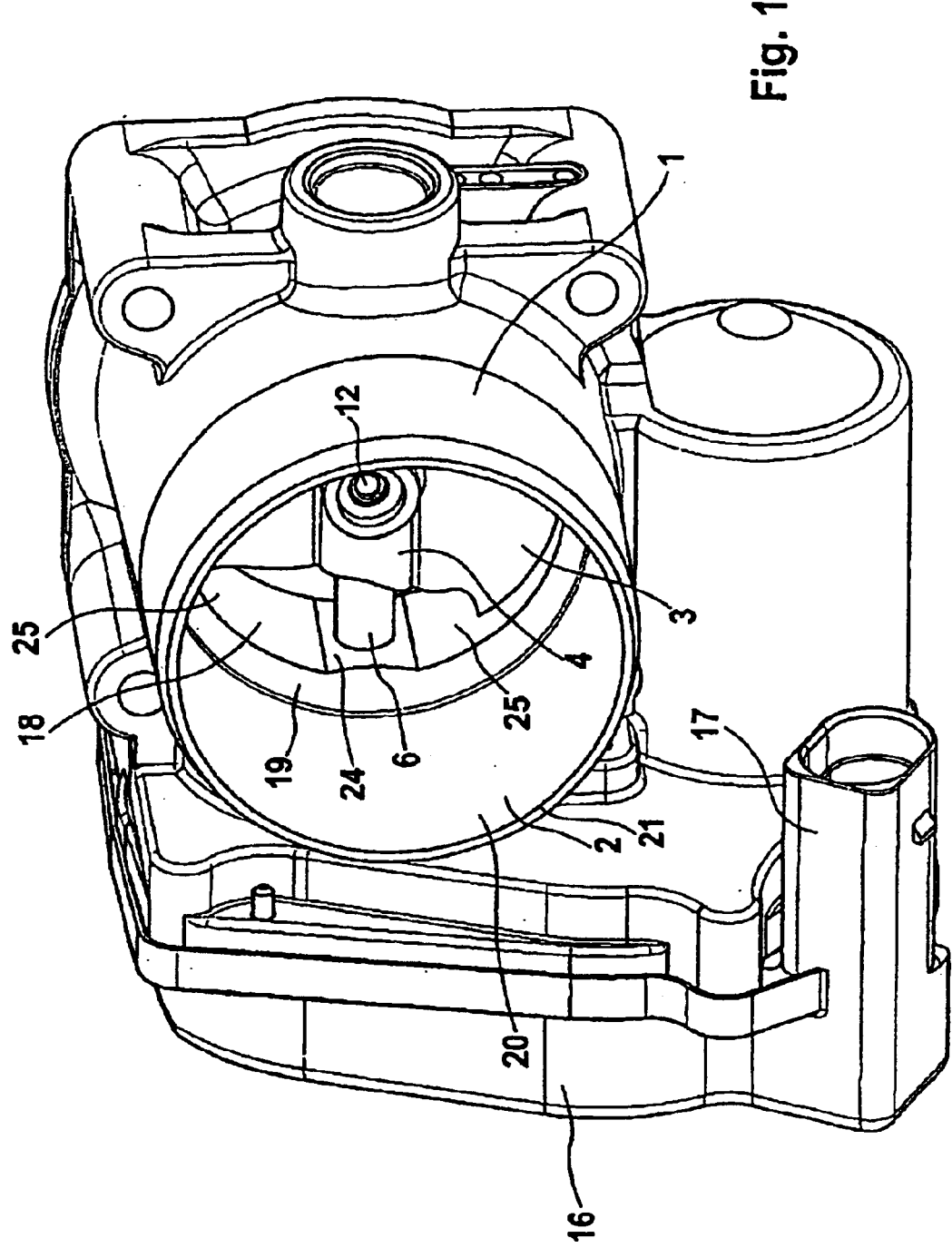
FIG. 1 shows a perspective view of a first exemplary embodiment of a throttle valve body.

The throttle valve bodies illustrated in the figures have a housing 1 with a crossflow opening 2 with an approximately circular cross section, in which a throttle valve 3 with approximately circular shape is arranged in order to block the crossflow opening 2. The throttle valve 3 has a holding sleeve 4 which extends centrally over its surface and in whose axial recess 5 of circular cross section a throttle valve shaft 6 is inserted in such a way that, on both sides, the ends of the throttle valve shaft 6 on the throttle valve 3 protrude and project into needle bearings 7 in the housing.

In order to fix the throttle valve shaft 6 in the axial recess 5, a stepped hole 8 passing through transversely is formed in the holding sleeve 4, its large step being located on one side of the wall of the holding sleeve 4 and being used to accommodate a screw head 9 of a fixing screw 10. With its threaded shank 11, the fixing screw 10 is screwed into a corresponding threaded hole 12, coaxial with the stepped hole 8, in the throttle valve shaft 6 and, in this way, connects throttle valve shaft 6 and throttle valve 3 firmly to each other.

The needle bearings are inserted with their outer rings 13 with a press fit in corresponding bearing recesses 14.

The right-hand end of the throttle valve shaft 6 can be driven by an electric motor drive so as to pivot against the force of a return spring 15 from a closed position of the throttle valve 3 into its opening position. The electric motor drive, not illustrated, is located in a drive housing 16 of the housing 1, which also has a plug-in connection 17 for the power supply and the drive lines.

In the region of the throttle valve 3, the crossflow opening 2 of the throttle valve body has an approximately cylindrical section 18, which is adjoined on both sides by short, highly conically widening sections which, in turn, are extended by slightly conically widening further sections 20 as far as the connecting openings 21 of the crossflow opening 2.

Figure 2:
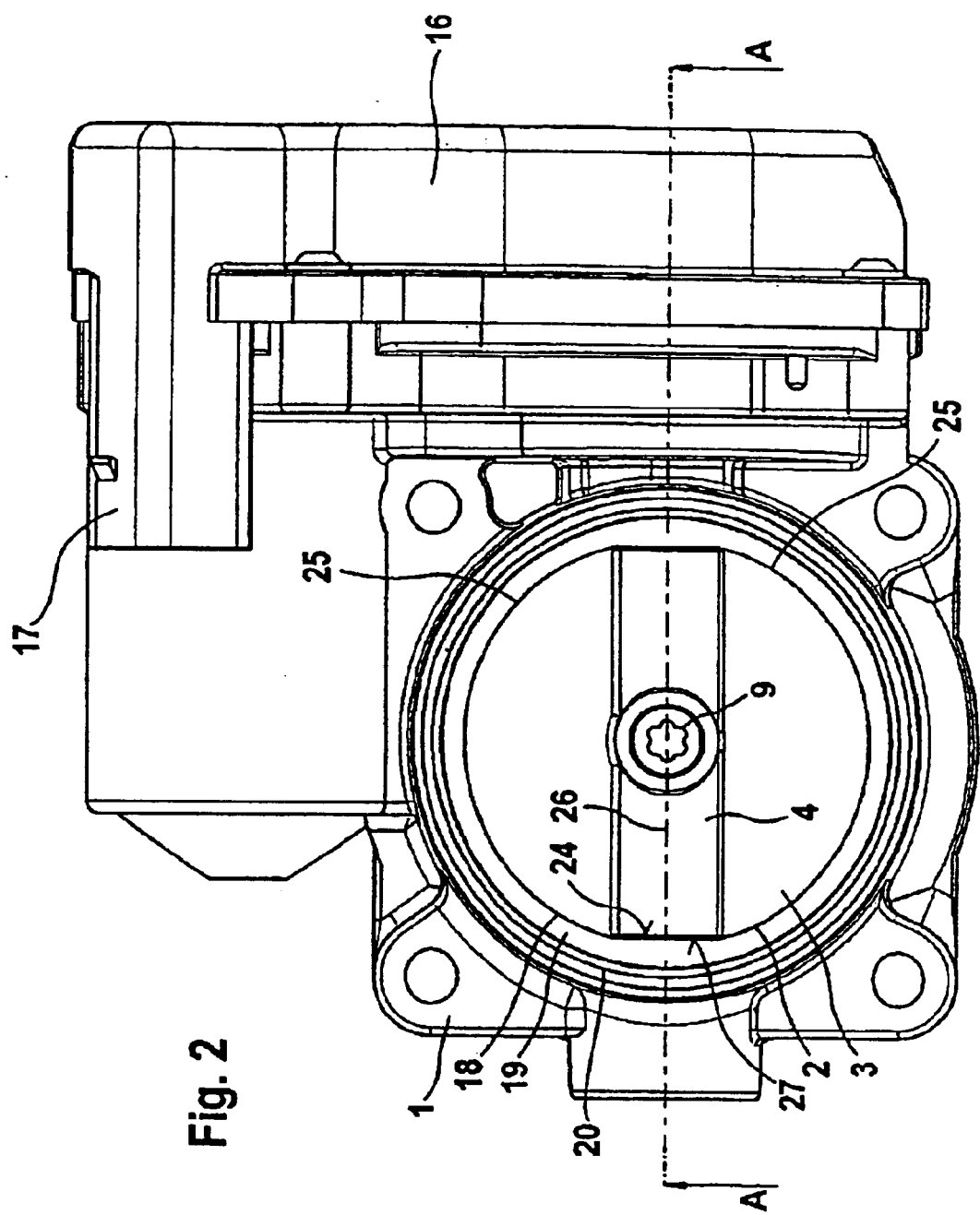
FIG. 2 shows a side view of the throttle valve body according to FIG. 1.
Figure 3:
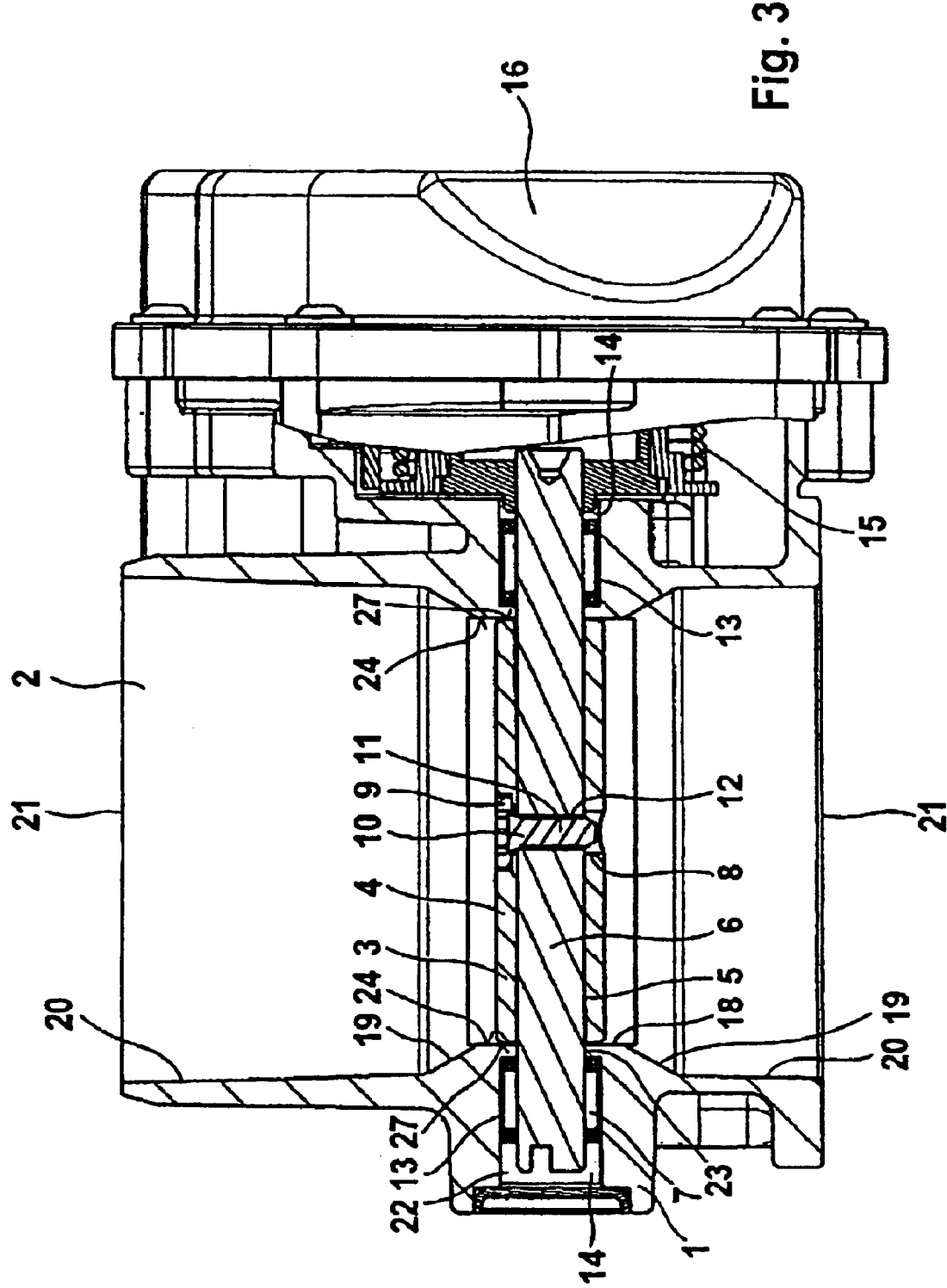
FIG. 3 shows a partial section along the line A—A in FIG. 2.

In the exemplary embodiment of FIGS. 1 to 3, the bearing recesses 14 are stepped holes, in whose large steps 22 the needle bearings 7 are inserted, and whose small steps 23 open into the crossflow opening 2. In this case, the diameter of the small steps 23 corresponds approximately to the diameter of the throttle valve shaft 6.

The approximately cylindrical section 18 has a stadium-like cross section with supporting regions 24, which are parallel to one another and at right angles to the longitudinal axis 26 of the throttle valve shaft 6, in those regions on the inner wall of the crossflow opening 2 which surround the mouth openings of the small steps 23. In each case, two mutually facing ends of the supporting regions 24 are connected to each other by regions 25 shaped like circular arcs.

The end openings of the holding sleeve 4 bear on the mutually parallel supporting regions 24 of the section 18 of the crossflow opening 2, form the run-on surfaces 27 and determine and secure the position of the throttle valve 3 in the crossflow opening 2 axially with respect to the longitudinal axis 26 of the throttle valve shaft 6.

Since, in the exemplary embodiment of FIGS. 1 to 3, both the throttle valve 3 and the housing 1 are injection-molded from plastic and thus have an at least approximately equal thermal expansion coefficient, in the event of thermal loading, jamming of the run-on surfaces 27 of the holding sleeve 4 between the supporting regions 24 of the housing 1 cannot occur.

Production from plastic leads to a low weight and low production costs.

Figure 4:
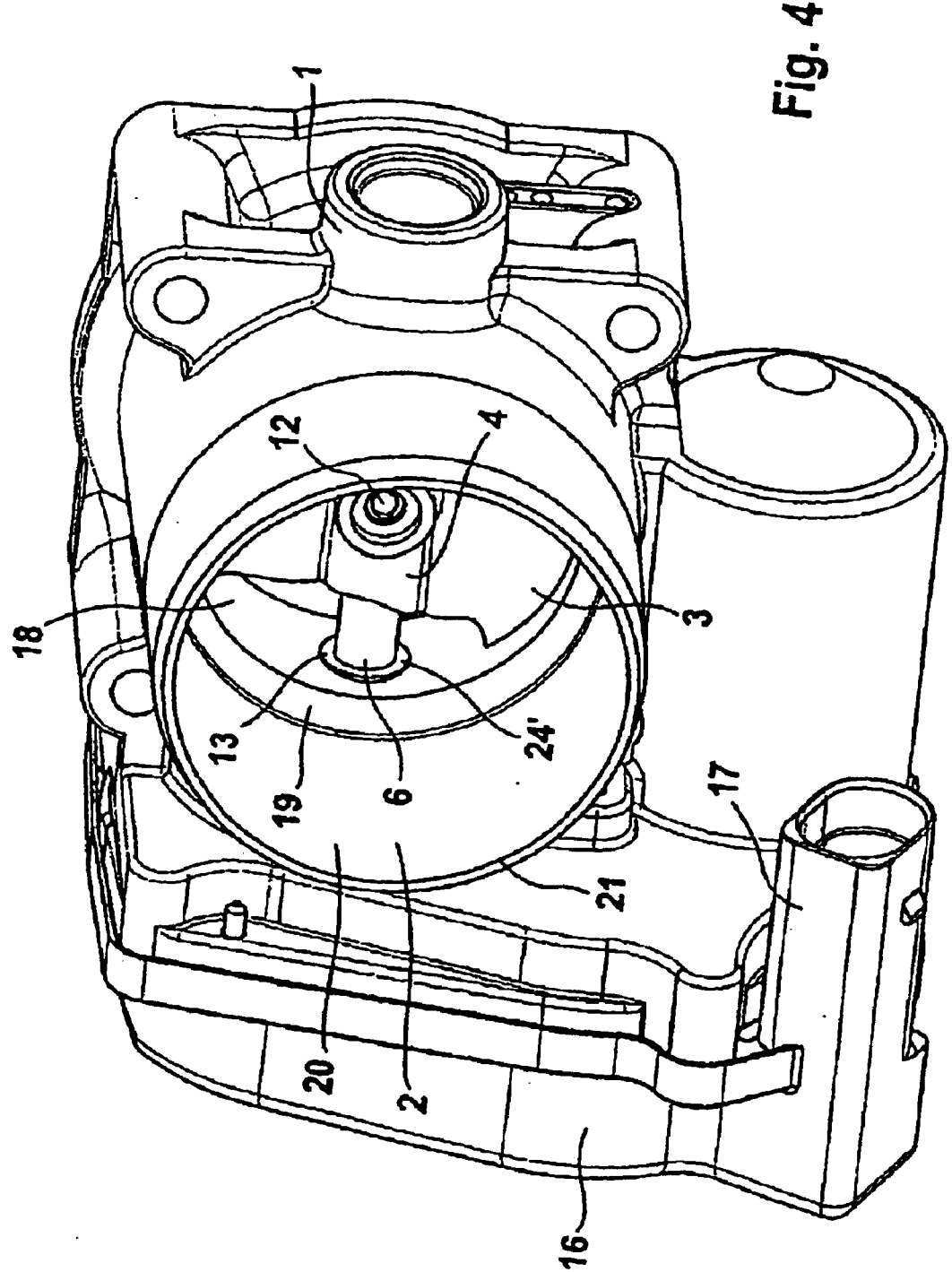
FIG. 4 shows a perspective view of a second exemplary embodiment of a throttle valve body.
Figure 5:
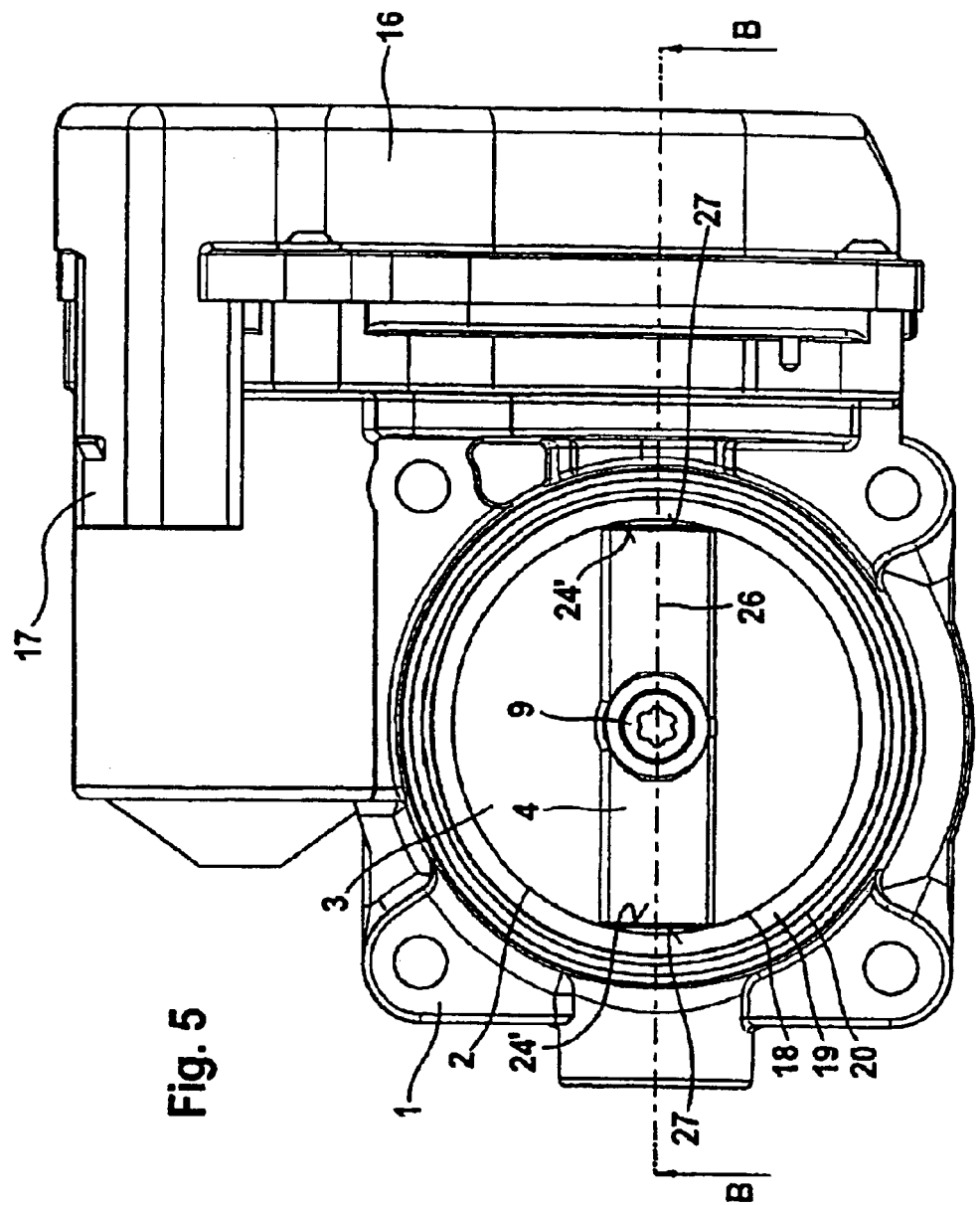
FIG. 5 shows a side view of the throttle valve body according to FIG. 4.
Figure 6:
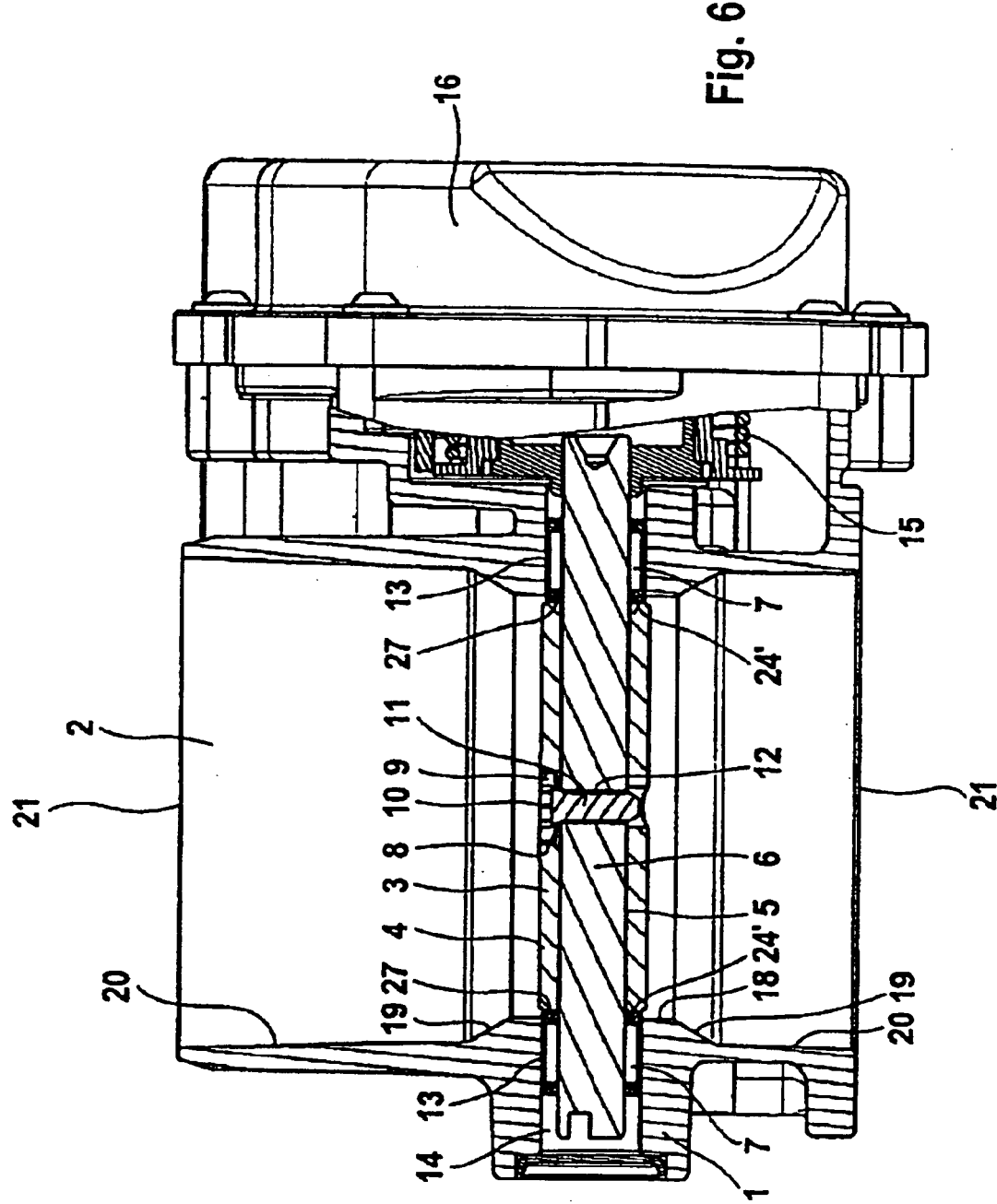
FIG. 6 shows a partial section along the line B—B in FIG. 5.

In the exemplary embodiment of FIGS. 4 to 6, the bearing recesses 14 are through holes of identical diameter, into which the needle bearings 7 are inserted with their outer ring 13 with a press fit.

The throttle valve 3 has the same construction as in the exemplary embodiment of FIGS. 1 to 3 and, at the ends of its holding sleeve 4, also has the run-on surfaces 27 which are mutually parallel and at right angles to the longitudinal axis 26 of the throttle valve shaft 6. These run-on surfaces 27 bear on those ends of the outer rings 13 of the needle bearings 7 which are oriented toward the crossflow opening 2 and which project by a small amount into the section 18 of circular cross section of the crossflow opening 2. These ends oriented toward the crossflow opening 2 at the same time form supporting regions 24', which determine and secure the position of the throttle valve 3 axially with respect to the longitudinal axis 26 of the throttle valve shaft 6 in the section 18 of the crossflow opening 2.

The determination of these bearings is carried out by means of the corresponding axial insertion of the needle bearings 7 into the bearing recesses 14 with a press fit.

In the exemplary embodiment of FIGS. 4 to 6, both housing 1 and throttle valve 3 are aluminum injection die-castings.

Figure 7:
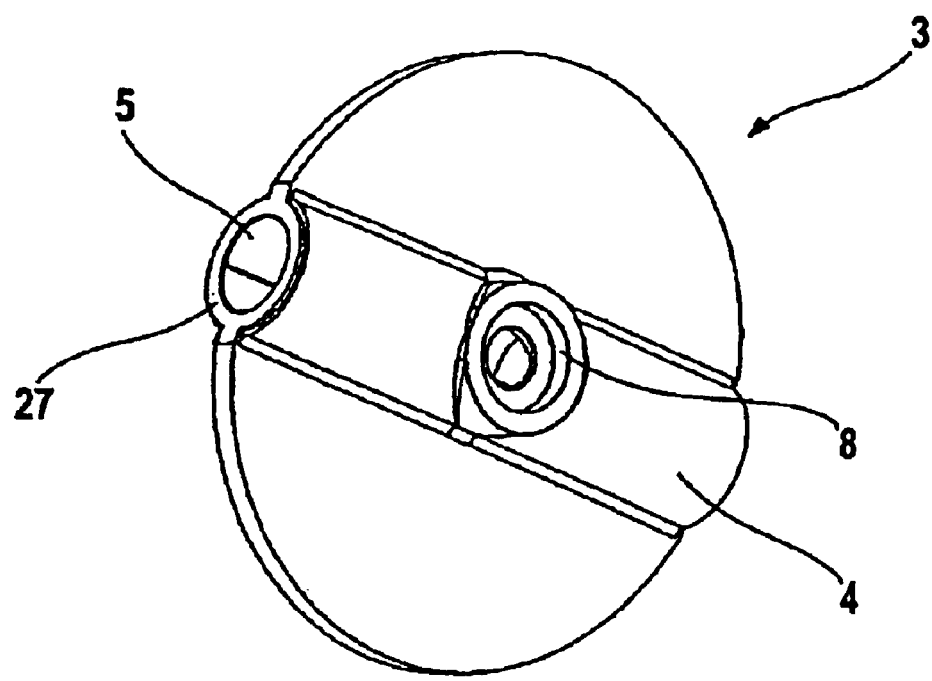
FIG. 7 shows a perspective view of a throttle valve.

The throttle valve 3 in FIG. 7 is the illustration of the throttle valve 3, which has the same construction for both exemplary embodiments and differs only in its material.

I claim:

1. A throttle valve body for an internal combustion engine, comprising a housing and a crossflow opening in the housing, which can be blocked by a throttle valve, the throttle valve being arranged on a throttle valve shaft which can be driven so as to pivot about its longitudinal axis extending transversely with respect to the longitudinal axis of the crossflow opening and whose free ends are mounted such that they can pivot in bearings which are arranged in bearing recesses in the housing, and the throttle valve shaft being secured against axial displacement by an axial safety device, in its regions in which the throttle valve shaft protrudes axially, the throttle valve having run-on surfaces which bear on supporting regions fixed to the housing, characterized in that the supporting regions are those ends of the bearings which are oriented toward the crossflow opening, and the throttle valve has a holding sleeve, in whose axial recess the throttle valve shaft is firmly arranged and whose ends form the run-on surfaces.

2. The throttle valve body according to claim 1, wherein the run-on surfaces extend at right angles to the longitudinal axis of the throttle valve shaft and parallel to each other.

3. The throttle valve body according to claim 1, wherein the supporting regions extend at right angles to the longitudinal axis of the throttle valve shaft.

4. The throttle valve body according to claim 1, wherein the throttle valve has a stadium-like circumferential contour which, starting from the mutually parallel run-on surfaces, is formed in a circular and/or curved shape.

5. The throttle valve body according to claim 1, wherein the extent of the supporting regions in the direction of the longitudinal axis of the crossflow opening and/or transversely with respect to the direction of the longitudinal axis of the crossflow opening corresponds approximately to the external diameter of the holding sleeve.

6. The throttle valve body according to claim 1, wherein the throttle valve shaft is fixed in the axial recess of the holding sleeve by means of a pin passing transversely through holding sleeve and throttle valve shaft or a screw passing through transversely.

7. The throttle valve body according to claim 1, wherein the bearings have bearing sleeves which are inserted into the bearing recesses of the housing with a press fit.

8. The throttle valve body according to claim 7, wherein the bearing sleeves project into the crossflow opening by a small amount.

9. The throttle valve body according to claim 7, wherein the bearings are rolling-contact bearings with an inner ring and an outer ring, those ends of the inner rings or of the outer rings which are oriented toward the crossflow opening forming the supporting regions.

10. The throttle valve body according to claim 1, wherein the housing and/or the throttle valve consist of a plastic.

11. The throttle valve body according to claim 1, wherein the housing and/or the throttle valve consist of metal, in particular lightweight metal.

12. The throttle valve body according to claim 1, wherein the housing and/or the throttle valve is an injection molding.

13. The throttle valve body according to claim 8, wherein the bearings are rolling-contact bearings with an inner ring and an outer ring, those ends of the inner rings or of the outer rings which are oriented toward the crossflow opening forming the supporting regions.

14. A throttle valve body for an internal combustion engine, comprising a housing and a crossflow opening in the housing, which can be blocked by a throttle valve, the throttle valve being arranged on a throttle valve shaft which can be driven so as to pivot about its longitudinal axis extending transversely with respect to the longitudinal axis of the crossflow opening and whose free ends are mounted such that they can pivot in bearings which are arranged in bearing recesses in the housing, and the throttle valve shaft being secured against axial displacement by an axial safety device, in its regions in which the throttle valve shaft protrudes axially, the throttle valve having run-on surfaces which bear on supporting regions fixed to the housing, characterized in that the supporting regions are those ends of the bearings which are oriented toward the crossflow opening, and the throttle valve has a stadium-like circumferential contour which, starting from the mutually parallel run-on surfaces, is formed in a circular and/or curved shape.

15. The throttle valve body according to claim 14, wherein the run-on surfaces extend at right angles to the longitudinal axis of the throttle valve shah and parallel to each other.

16. The throttle valve body according to claim 14, wherein the supporting regions extend at right angles to the longitudinal axis of the throttle valve shaft.

17. The throttle valve body according to claim 14, wherein the throttle valve has a holding sleeve, in whose axial recess the throttle valve shaft is firmly arranged and whose ends form the run-on surfaces.

18. The throttle valve body according to claim 17, wherein the extent of the supporting regions in the direction of the longitudinal axis of the crossflow opening and/or transversely with respect to the direction of the longitudinal axis of the crossflow opening corresponds approximately to the external diameter of the holding sleeve.

19. The throttle valve body according to claim 18, wherein the throttle valve shaft is fixed in the axial room of the holding sleeve by means of a pin passing transversely through holding sleeve and throttle valve shaft or a screw passing through transversely.

20. The throttle valve body according to claim 14, wherein the bearings have bearing sleeves which are inserted into the bearing recesses of the housing with a press fit.

21. The throttle valve body according to claim 20, wherein the bearing sleeves project into the crossflow opening by a small amount.

22. The throttle valve body according to claim 21, wherein the bearings are rolling-contact bearings with an inner ring and an outer ring, those ends of the inner rings or of the outer rings which are oriented toward the crossflow opening forming the supporting regions.

23. The throttle valve body according to claim 14, wherein the housing and/or the throttle valve consist of a plastic.

24. The throttle valve body according to claim 14, wherein the housing and/or the throttle valve consist of metal, in particular lightweight metal.

25. The throttle valve body according to claim 14, wherein the housing and/or the throttle valve is an injection molding.

26. The throttle valve body according to claim 20, wherein the bearings are rolling-contact bearings with an inner ring and an outer ring, those ends of the inner rings or of the outer rings which are oriented toward the crossflow opening forming the supporting regions.

* * * * *